(12) United States Patent
Wu

(10) Patent No.: US 12,742,956 B1
(45) Date of Patent: Sep. 22, 2026

(54) DUAL-LIGHT-SOURCE RED DOT SIGHT

(71) Applicant: Guangzhou Saiyili Technology Co., Ltd., Guangzhou (CN)

(72) Inventor: Xiaozhong Wu, Guangzhou (CN)

(73) Assignee: Guangzhou Saiyili Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/435,842

(22) Filed: Dec. 30, 2025

(30) Foreign Application Priority Data

Nov. 10, 2025 (CN) ........................ 202522387161.7

(51) Int. Cl.
*G02B 23/10* (2006.01)
*F41G 1/30* (2006.01)
*G02B 27/20* (2006.01)

(52) U.S. Cl.
CPC ............ *G02B 23/105* (2013.01); *F41G 1/30* (2013.01); *G02B 27/20* (2013.01)

(58) Field of Classification Search
CPC ...... G02B 23/105; G02B 27/20; G02B 23/00; G02B 23/02; G02B 23/04; G02B 23/10; F41G 1/30; F41G 1/00; F41G 1/32; F41G 1/34; F41G 1/35; F41G 1/38; F41G 1/42
USPC .... 359/399, 362, 428; 42/90, 111, 113, 114, 42/117, 119, 120, 122, 130, 131, 132, 42/134, 135, 136, 137, 146
See application file for complete search history.

(56) References Cited

U.S. PATENT DOCUMENTS 10,948,264 B1 * 3/2021 Brumfield ................. F41G 1/30
11,644,275 B2 * 5/2023 Kennedy ................. F41G 1/345 42/113
2018/0128574 A1 * 5/2018 Crispin ................ G02B 23/105

FOREIGN PATENT DOCUMENTS

WO WO-2024027245 A1 * 2/2024 ............. G02B 27/30

* cited by examiner

*Primary Examiner* — Arnel C Lavarias
(74) *Attorney, Agent, or Firm* — RAYCHAN PATENT FIRM; Raymond Y Chan

(57) ABSTRACT

A dual-light-source red dot sight includes: a housing having a first opening at one end and a second opening at the other end, with a through channel formed inside the housing and extending from the first opening to the second opening; a first light source assembly and a second light source assembly mounted in the through channel and arranged one above the other in a height direction perpendicular to a centerline of the through channel, wherein the first light source assembly is configured to emit a first light beam, and the second light source assembly is configured to emit a second light beam; and a light adjustment module mounted in the through channel and configured to adjust light emitted by the first light source assembly and the second light source assembly.

9 Claims, 5 Drawing Sheets

DUAL-LIGHT-SOURCE RED DOT SIGHT

CROSS REFERENCE OF RELATED APPLICATION

This application is a non-provisional application that claims the benefit of priority under 35U.S.C. § 119 to a Chinese application number 202522387161.7, filed Nov. 10, 2025, which is incorporated herewith by reference in its entirety.

BACKGROUND OF THE PRESENT INVENTION

Field of Invention

The present invention relates to the technical field of sights, and more particularly to a dual-light-source red dot sight.

Description of Related Arts

A red dot sight, as an optical device capable of providing a rapid aiming point, has been widely applied in various fields. To improve reliability, a red dot sight of dual-light-source design has emerged in the prior art. By providing two independent light sources within a sight body, when one light source fails, a user may switch to the other, thereby maintaining an aiming function.

However, in an existing dual-light-source red dot sight, two light sources are typically disposed one in front of the other in parallel along a direction of an optical axis of the sight. This layout directly leads to a significant increase in the overall length of the sight, resulting in a bulky product with poor portability. Furthermore, it makes the sight more susceptible to damage due to excessive structural length when subjected to impact, while also undermining the overall balance when the sight is mounted on a weapon. Therefore, there is a need for a novel red dot sight that can effectively reduce product volume and improve structural compactness while ensuring a dual-light-source redundancy function.

SUMMARY OF THE PRESENT INVENTION

The present invention aims to solve the above-mentioned technical problem in the prior art and provide a dual-light-source red dot sight with a compact structure and a small volume. To achieve the above objective, the present invention adopts the following technical solution.

A dual-light-source red dot sight includes: a housing having a first opening at one end and a second opening at the other end, with a through channel formed inside the housing and extending from the first opening to the second opening; a first light source assembly and a second light source assembly mounted in the through channel and arranged one above the other in a height direction perpendicular to a centerline of the through channel, wherein the first light source assembly is configured to emit a first light beam, and the second light source assembly is configured to emit a second light beam; and a light adjustment module mounted in the through channel and configured to adjust light emitted by the first light source assembly and the second light source assembly.

Further, the first light source assembly and the second light source assembly are arranged to be staggered from each other in a direction perpendicular to the centerline of the through channel.

Further, the first light source assembly and the second light source assembly are arranged to be aligned with each other in a direction perpendicular to the centerline of the through channel.

Further, the light adjustment module includes: a first collimating lens disposed in a path of the first light beam and configured to collimate the first light beam; a second collimating lens disposed in a path of the second light beam and configured to collimate the second light beam; a first mirror mounted in a path of the first light beam collimated by the first collimating lens and reflecting the first light beam; an optical filter mounted in a path of the first light beam reflected by the first mirror and reflecting the first light beam and allowing the second light beam to pass through; a second mirror mounted in a path of the first light beam reflected by the optical filter and in a path of the second light beam and reflecting the first light beam and the second light beam; and a beam splitter mounted in a path of the light beams reflected by the second mirror and reflecting the light beams to a human eye.

Further, the beam splitter is obliquely disposed facing the second light source assembly, and an exit direction of the light beams reflected by the beam splitter is opposite to a light beam emitting direction of the first light source assembly and the second light source assembly.

Further, the beam splitter is obliquely disposed facing away from the second light source assembly, and an exit direction of the light beams reflected by the beam splitter is the same as a light beam emitting direction of the first light source assembly and the second light source assembly.

Further, the first light source assembly further includes a first adjustment mechanism, and the second light source assembly further includes a second adjustment mechanism, the first adjustment mechanism and the second adjustment mechanism being respectively configured to independently adjust emission characteristics of the first light source assembly and the second light source assembly.

Further, the first adjustment mechanism and the second adjustment mechanism are physical keys, touch switches or adjustment rotating screws.

Further, the first light source assembly further includes a first windage adjustment port and a first elevation adjustment port, which are respectively configured to adjust a windage angle and an elevation angle of the first light beam; and the second light source assembly further includes a second windage adjustment port and a second elevation adjustment port, which are respectively configured to adjust a windage angle and an elevation angle of the second light beam.

Further, the dual-light-source red dot sight further includes a first power supply module and a second power supply module disposed within the housing, wherein the first power supply module is configured to supply power to the first light source assembly, and the second power supply module is configured to supply power to the second light source assembly.

The foregoing overview is intended only to explain the description and is not to be construed as limiting. In addition to the schematic aspects, embodiments, and features described above, further aspects, embodiments, and features will become apparent by reference to the drawings and the following detailed description.

BRIEF DESCRIPTION OF THE DRAWINGS

In the drawings, unless otherwise specified, the same reference numerals across multiple drawings denote the same or similar parts or elements. These drawings are not necessarily drawn to scale. It should be understood that the drawings merely depict certain embodiments disclosed in the present invention and are not to be construed as limiting the scope of the present invention.

LIST OF REFERENCE SIGNS

Figure 1:
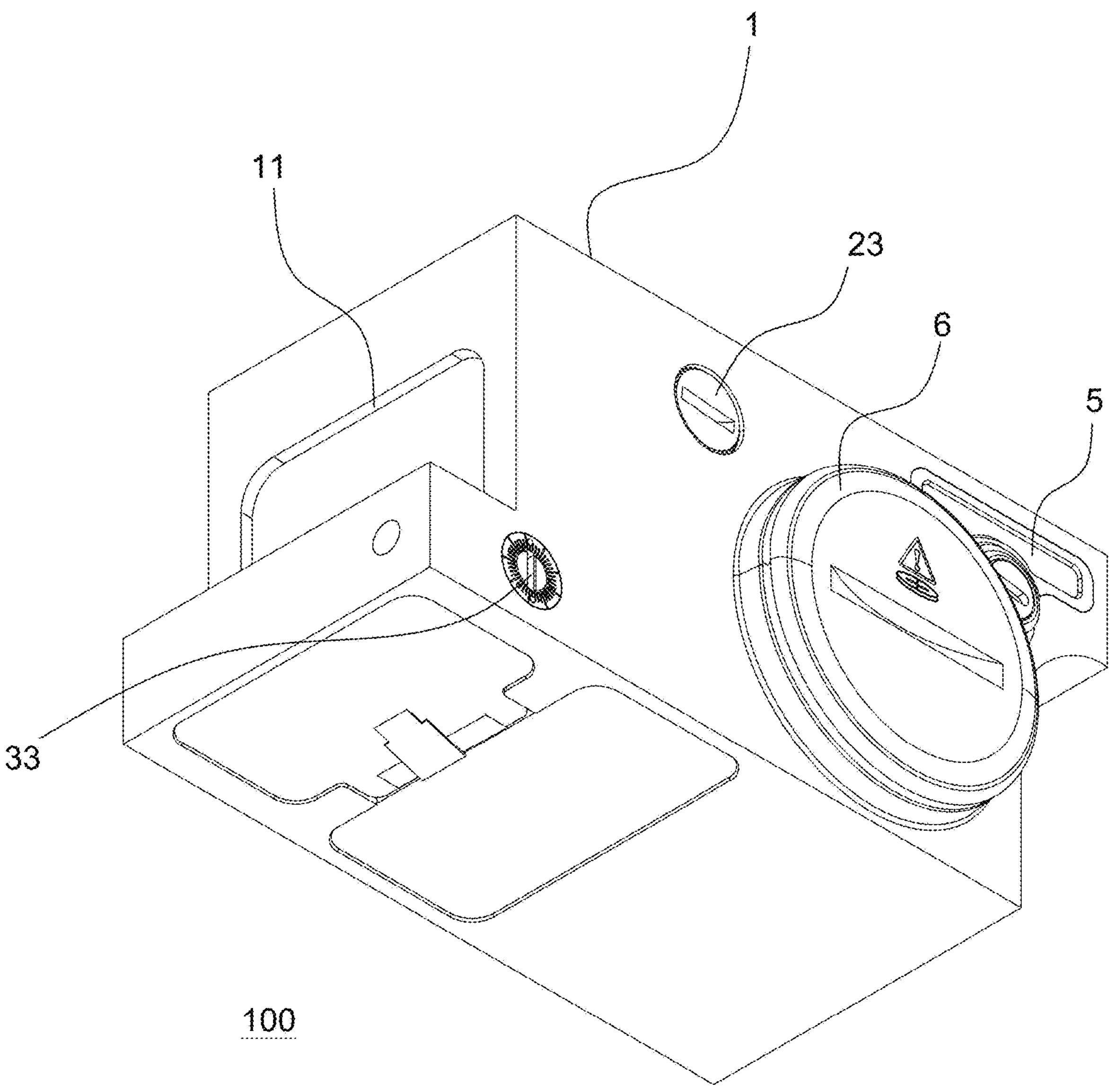
FIG. 1 is a perspective view of a dual-light-source red dot sight according to one embodiment of the present invention.

Housing; 11. First opening; 12. Second opening; 13. Through channel; 2. First light source assembly; 21. First light beam; 22. First adjustment mechanism; 23. First windage adjustment port; 24. First elevation adjustment port; 3. Second light source assembly; 31. Second light beam; 32. Second adjustment mechanism; 33. Second windage adjustment port; 34. Second elevation adjustment port; 4. Light adjustment module; 41. First mirror; 42. Optical filter; 43. Second mirror; 44. Beam splitter; 46. First collimating lens; 47. Second collimating lens; 5. First power supply module; 6. Second power supply module; 100. Dual-light-source red dot sight.

DETAILED DESCRIPTION OF THE PREFERRED EMBODIMENT

The following discloses multiple embodiments of the technical solutions of the present invention. To simplify the disclosure, specific examples of elements and arrangements are described. These are merely examples and do not limit the scope of protection of the present invention. For example, where the specification describes that a first feature is formed "above" or "on" a second feature, it may include embodiments where the first and second features are directly connected, as well as embodiments where additional features intervene. Similarly, repeated use of reference numerals across examples is for brevity and clarity only and does not imply any relationship between embodiments. Furthermore, when an element is described as being "connected" or "coupled" to another element, this includes both direct and indirect connections or couplings through one or more intermediate elements.

The following only briefly describes certain exemplary embodiments. As those skilled in the art will recognize, various modifications may be made to the embodiments described without departing from the spirit or scope of the present invention. Therefore, the drawings and description are regarded as illustrative rather than restrictive.

Figure 4:
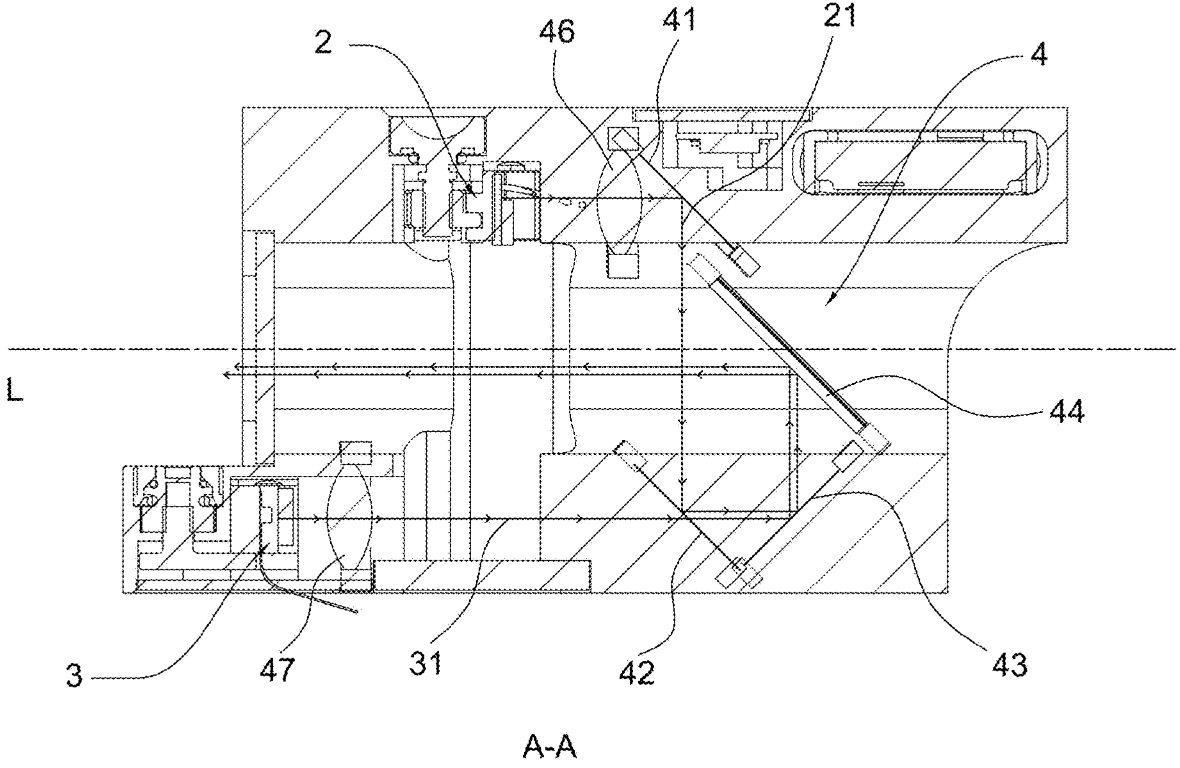
FIG. 4 is a cross-sectional view of one embodiment of section A-A in FIG. 3.
Figure 5:
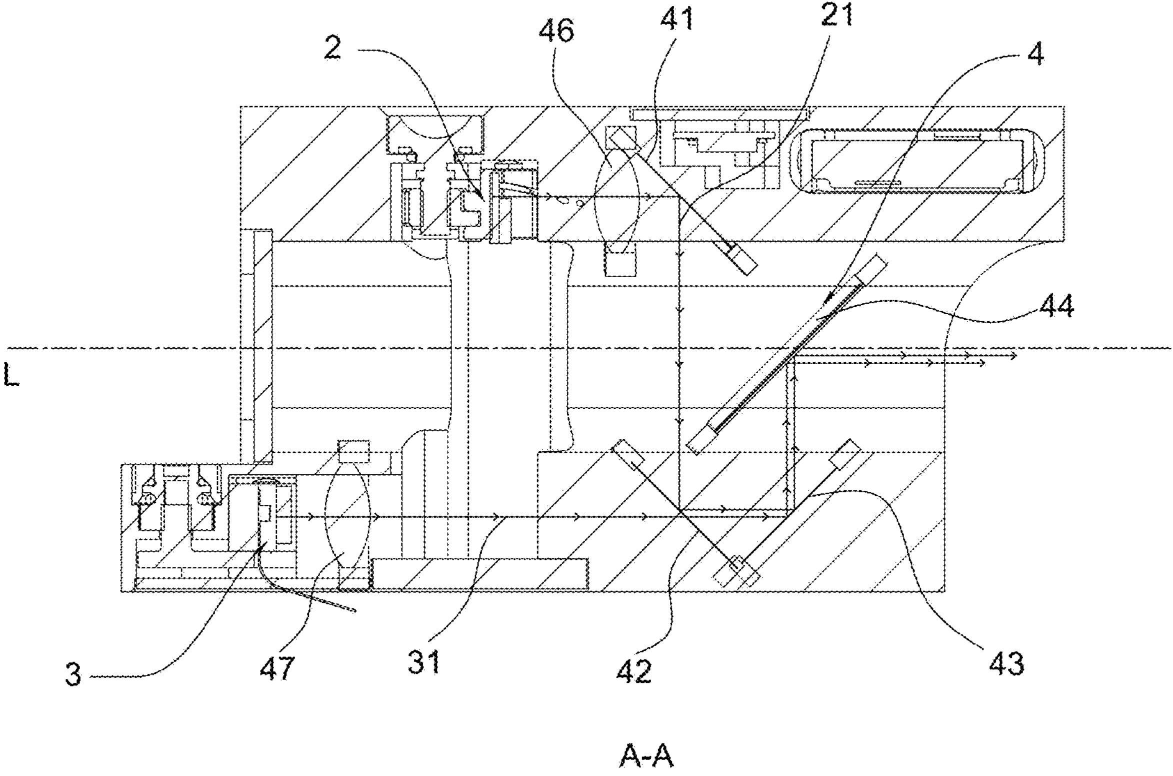
FIG. 5 is a cross-sectional view of another embodiment of section A-A in FIG. 3.

Referring to FIGS. 1, 4 and 5, a dual-light-source red dot sight 100 according to a preferred embodiment includes: a housing 1 having a first opening 11 at one end and a second opening 12 at the other end, with a through channel 13 formed inside the housing 1 and extending from the first opening 11 to the second opening 12; a first light source assembly 2 and a second light source assembly 3 mounted in the through channel 13 and arranged one above the other in a height direction perpendicular to a centerline L of the through channel 13, wherein the first light source assembly 2 is configured to emit a first light beam 21, and the second light source assembly 3 is configured to emit a second light beam 31; and a light adjustment module 4 mounted in the through channel 13 and configured to adjust light emitted by the first light source assembly 2 and the second light source assembly 3. In this embodiment, two light sources are arranged one above the other in a stacked manner in the perpendicular direction, and thus occupy less lateral space and achieve a more compact structure compared with a dual-light-source arrangement on the same horizontal line. The centerline L refers to a length direction of the sight. When the sight is in a horizontal position relative to the ground, the two light sources are arranged one above the other, with their positions defined only in an up-down direction but not in front-rear and left-right directions. That is, the first light source assembly 2 and the second light source assembly 3 are at any positions on their respective horizontal planes. The through channel 13 forms a main cavity for light propagation and lens mounting. The first opening 11 is generally an exit window, and the second opening 12 is generally an entrance window. Alternatively, the first opening 11 is an entrance window, and the second opening 12 is an exit window. The housing 1 may have a circular cylindrical or square cylindrical shape, or other polygonal cylindrical shapes that conform to aerodynamic and aesthetic designs. By arranging the two light source assemblies one above the other, the dimension of the sight in the length direction is greatly reduced, and the overall structure is miniaturized and made compact. This not only improves portability and aesthetics, but also enhances structural strength and stability, enabling the sight to perform better when subjected to recoil or impact. Furthermore, this layout provides new space for integrated design of internal optical paths. Having two light source assemblies can also achieve that when one of the light source assemblies fails, the other light source assembly is enabled, improving redundancy.

With reference to FIGS. 4 and 5, in a preferred embodiment, the first light source assembly 2 and the second light source assembly 3 are arranged to be staggered from each other in a direction perpendicular to the centerline L of the through channel 13. The "staggered arrangement" means that the first light source assembly 2 and the second light source assembly 3 are not only at different positions in the height direction, but are also offset from each other in the front-rear direction, i.e., one light source assembly is located obliquely above or obliquely below the other light source assembly. A stagger angle and a stagger distance may be optimally designed according to the layout of internal optical elements to optimally utilize space and ensure unobstructed light paths. The staggered arrangement in the technical solution of this embodiment provides greater design flexibility, and can better avoid structural interference between the two light source assemblies, facilitate installation and wiring, and reserve sufficient space for arranging a complex optical path system.

In other embodiments, the first light source assembly 2 and the second light source assembly 3 are arranged to be aligned with each other in a direction perpendicular to the centerline L of the through channel 13. This up-down arrangement is another preferred implementation. The "aligned arrangement" means that the two light source assemblies are positioned approximately at the same location in a horizontal direction (i.e., the front-rear direction) while strictly arranged one above the other in the perpendicular direction. In this layout, the two light source assemblies can share part of a mounting structure or a circuit board, further simplifying the internal structure, making the layout of light sources most compact. This can minimize projection dimensions of the sight in length and width, and achieve ultimate miniaturization. This layout is particularly suitable for application scenarios with strict requirements on lateral volume.

With reference to FIGS. 4 and 5, the light adjustment module 4 includes: a first collimating lens 46 disposed in a path of the first light beam 21 and configured to collimate the first light beam 21; a second collimating lens 47 disposed in a path of the second light beam 31 and configured to collimate the second light beam 31; a first mirror 41 mounted in a path of the first light beam 21 collimated by the first collimating lens 46 and reflecting the first light beam 21; an optical filter 42 mounted in a path of the first light beam 21 reflected by the first mirror 41 and reflecting the first light beam 21 and allowing the second light beam 31 to pass through; a second mirror 43 mounted in a path of the first light beam 21 reflected by the optical filter 42 and in a path of the second light beam 31 and reflecting the first light beam 21 and the second light beam 31; and a beam splitter 44 mounted in a path of the light beams reflected by the second mirror 43 and reflecting the light beams to a human eye. In this embodiment, by means of the cooperation of a series of lenses, scattered light emitted from light sources at two different positions, one of which is above the other, is gradually integrated and adjusted into parallel aiming light beams. The first mirror 41 and the second mirror 43 may be single-sided mirrors or double-sided mirrors, and the optical filter 42 may be a dichroic filter or another type of beam splitter capable of achieving the function, without limitations herein. In this embodiment, a side of the optical filter 42 facing the second light source assembly 3 allows a specific light beam to pass through, and a side of the optical filter facing away from the second light source assembly 3 is configured to reflect a specific light beam. The optical system optically merges the two spatially separated light sources into the same line of sight, ensuring that regardless of the light from the light source located above or the light source located below, a finally emitted aiming point is clear, distortion-free and parallax-free.

Referring to FIG. 4, in a preferred embodiment, the beam splitter 44 is obliquely disposed facing the second light source assembly 3, and an exit direction of the light beams reflected by the beam splitter 44 is opposite to a light beam emitting direction of the first light source assembly 2 and the second light source assembly 3. Light paths of the first light beam 21 and the second light beam 31 from emission, through the light adjustment module 4, to exiting the sight are simply shown in a schematic diagram in the figure. It may be understood that since the optical filter 42 is a single-sided lens, the described one side can reflect the first light beam 21, and the other side allows the second light beam 31 to directly pass through. A coated surface of the beam splitter 44 is inclined toward the internal light sources, reflecting the light from the light sources out of the sight.

Referring to FIG. 5, in another preferred embodiment, the beam splitter 44 is obliquely disposed facing away from the first light source assembly 2, and an exit direction of the light beams reflected by the beam splitter 44 is the same as a light beam emitting direction of the first light source assembly 2 and the second light source assembly 3. Light paths of the first light beam 21 and the second light beam 31 from emission, through the light adjustment module 4, to exiting the sight are simply shown in a schematic diagram in the figure. It may be understood that since the optical filter 42 is a single-sided lens, the described one side can reflect the first light beam 21, and the other side allows the second light beam 31 to directly pass through. A coated surface of the beam splitter 44 is inclined away from the internal light sources to reflect the light from the light sources out of the sight.

Figure 2:
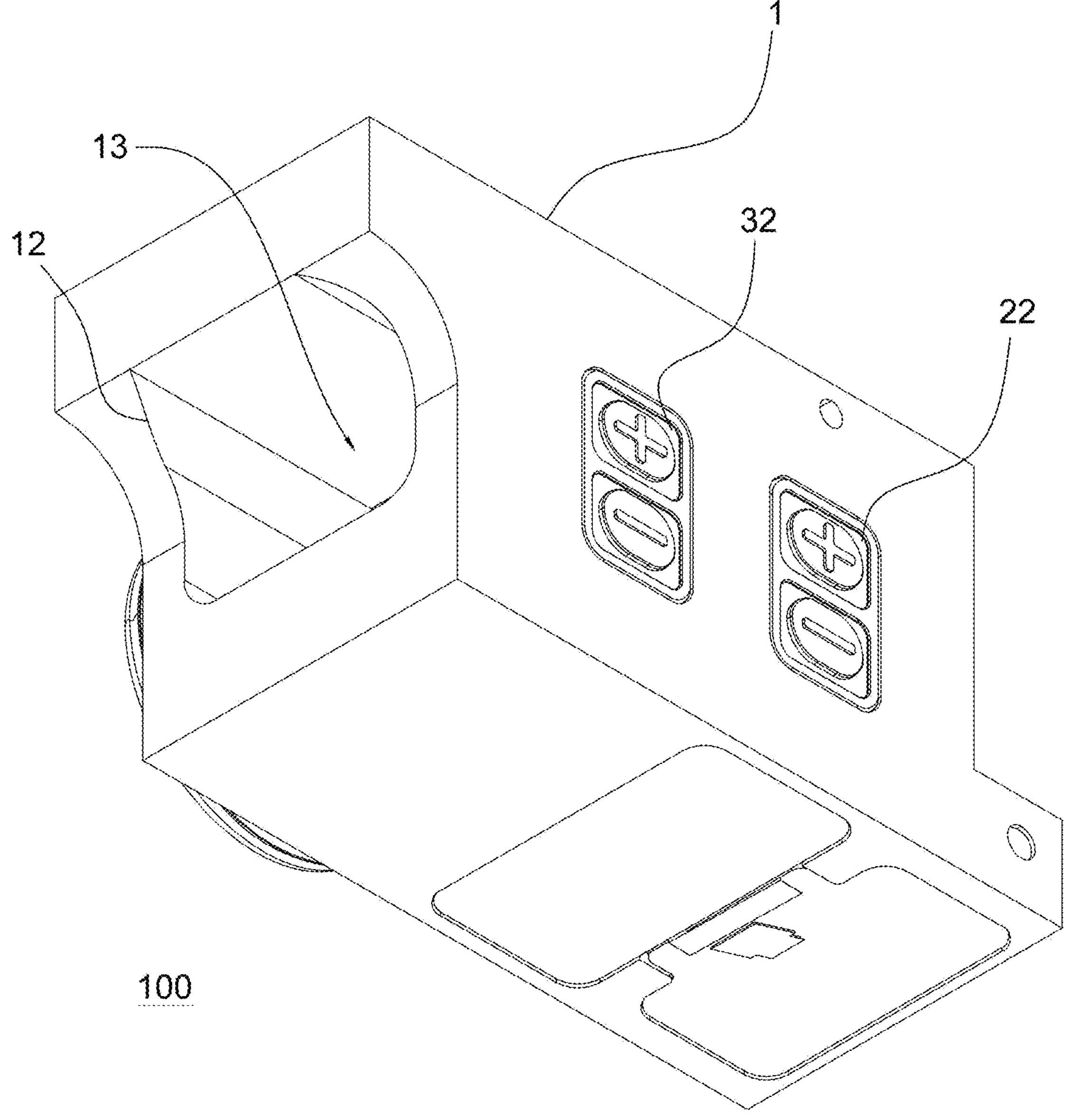
FIG. 2 is a perspective view of a dual-light-source red dot sight according to one embodiment of the present invention from another perspective.

Referring to FIG. 2, in a preferred embodiment, the first light source assembly 2 further includes a first adjustment mechanism 22, and the second light source assembly 3 further includes a second adjustment mechanism 32. The first adjustment mechanism 22 and the second adjustment mechanism 32 are respectively configured to independently adjust emission characteristics and on/off of the first light source assembly 2 and the second light source assembly 3. Preferably, the first adjustment mechanism 22 and the second adjustment mechanism 32 adopt button adjustment or other adjustment manners. The emission characteristics include, but are not limited to, brightness, color, reticle pattern (such as a dot, a circle, and a dot-circle combination). The two adjustment mechanisms may be physically independent, or may be logically independent at the software level via a multi-function controller, thus enabling independent and precise control of the two light sources. Users can set different parameters for each light source according to specific applications, which greatly enhances the applicability and user experience of the product.

Referring to FIG. 2, in a preferred embodiment, the first adjustment mechanism 22 and the second adjustment mechanism 32 are physical keys, touch switches or adjustment rotating screws. The physical keys and the adjustment rotating screws facilitate operation with gloved hands, and the touch switches offer a more modern and technological feel.

Figure 3:
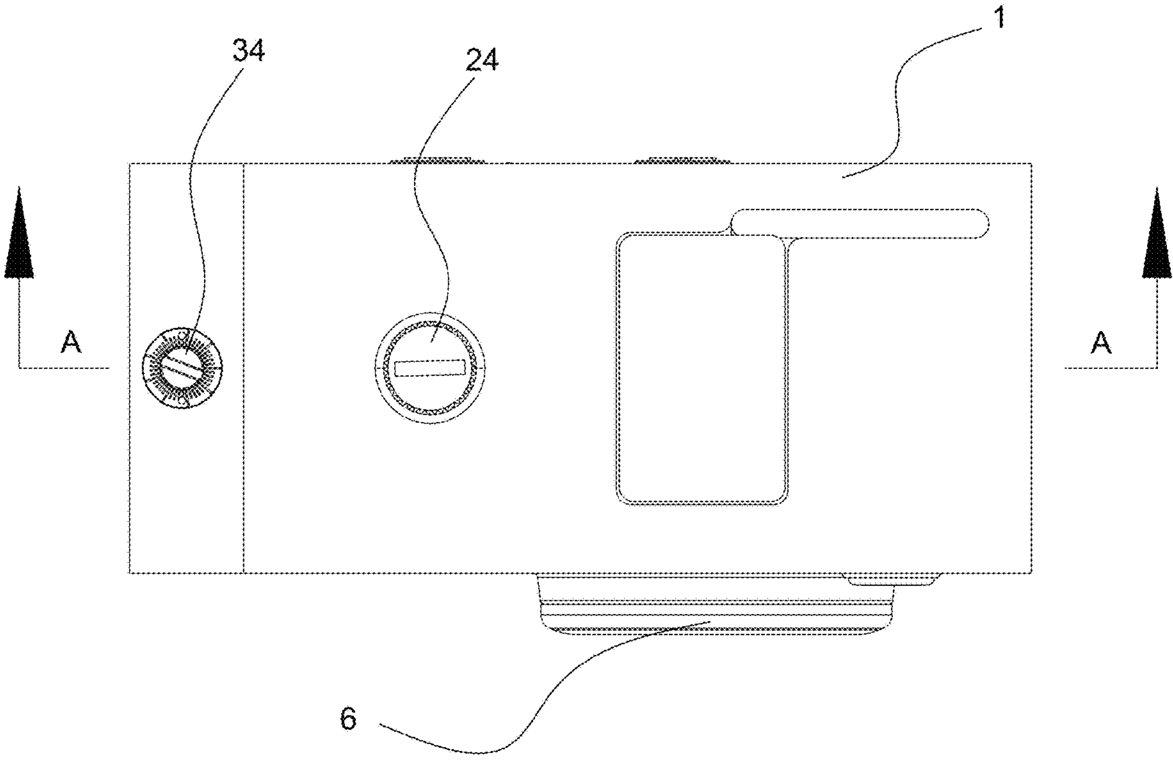
FIG. 3 is a top view of a dual-light-source red dot sight according to one embodiment of the present invention.

Referring to FIGS. 1 and 3, in a preferred embodiment, the first light source assembly 2 further includes a first windage adjustment port 23 and a first elevation adjustment port 24, which are respectively configured to adjust a windage angle and an elevation angle of the first light beam 21; and the second light source assembly 3 further includes a second windage adjustment port 33 and a second elevation adjustment port 34, which are respectively configured to adjust a windage angle and an elevation angle of the second light beam 31.

Referring to FIG. 1, in a preferred embodiment, the dual-light-source red dot sight 100 further includes a first power supply module 5 and a second power supply module 6 disposed within the housing 1. The first power supply module 5 is configured to supply power to the first light source assembly 2, and the second power supply module 6 is configured to supply power to the second light source assembly 3, thus forming two independent light source systems. One light source system is composed of the first light source assembly 2 and the first power supply module 5. The other light source system is composed of the second light source assembly 3 and the second power supply module 6. When one light source system fails, the other light source system can still operate independently without affecting the use of the sight. The first power supply module 5 and the second power supply module 6 include respective electrical circuits and batteries, and the batteries are detachably connected, so that the batteries can be removed from the outside for replacement and charging.

In the present invention, the two light source assemblies are arranged one above the other, making the sight structurally compact, and the two light source systems are integrated into a sight body. When any light source fails, the sight may immediately switch to the other light source, thereby further achieving high redundancy.

In the description of the present invention, references to the terms "one embodiment," "some embodiments," "example," "specific example," or "some examples" mean that the described features, structures, materials, or characteristics are included in at least one embodiment or example. Moreover, the described features, structures, materials, or characteristics may be combined in any suitable way in one or more embodiments or examples. Further, unless otherwise contradictory, different embodiments or examples and their features may be combined.

Additionally, the terms "first," "second," etc. are used for descriptive purposes only and should not be construed as indicating relative importance or implying any limitation on the number of features. Features described as "first" or "second" may include one or more such features. In the description of the present invention, the term "plurality" means two or more, unless specifically defined otherwise.

The foregoing are merely specific embodiments of the present invention and do not limit its protection scope. Any person skilled in the art can easily conceive of various modifications or substitutions within the scope of the disclosed technical solution, and these should all fall within the scope of protection of the present invention. Therefore, the scope of protection shall be defined by the appended claims.

What is claimed is:

1. A dual-light-source red dot sight, comprising:

a housing having a first opening at one end and a second opening at the other end, with a through channel formed inside the housing and extending from the first opening to the second opening;

a first light source assembly and a second light source assembly mounted in the through channel and arranged one above the other in a height direction perpendicular to a centerline of the through channel, wherein the first light source assembly is configured to emit a first light beam, and the second light source assembly is configured to emit a second light beam; and a light adjustment module mounted in the through channel and configured to adjust light emitted by the first light source assembly and the second light source assembly, wherein the light adjustment module comprises:

a first collimating lens disposed in a path of the first light beam and configured to collimate the first light beam;

a second collimating lens disposed in a path of the second light beam and configured to collimate the second light beam;

a first mirror mounted in a path of the first light beam collimated by the first collimating lens and reflecting the first light beam;

an optical filter mounted in a path of the first light beam reflected by the first mirror and reflecting the first light beam and allowing the second light beam to pass through;

a second mirror mounted in a path of the first light beam reflected by the optical filter and in a path of the second light beam and reflecting the first light beam and the second light beam; and a beam splitter mounted in a path of the light beams reflected by the second mirror and reflecting the light beams to a human eye.

2. The dual-light-source red dot sight according to claim 1, wherein the beam splitter is obliquely disposed facing the second light source assembly, and an exit direction of the light beams reflected by the beam splitter is opposite to a light beam emitting direction of the first light source assembly and the second light source assembly.

3. The dual-light-source red dot sight according to claim 1, wherein the beam splitter is obliquely disposed facing away from the second light source assembly, and an exit direction of the light beams reflected by the beam splitter is the same as a light beam emitting direction of the first light source assembly and the second light source assembly.

4. The dual-light-source red dot sight according to claim 1, wherein the first light source assembly further comprises a first adjustment mechanism, and the second light source assembly further comprises a second adjustment mechanism, the first adjustment mechanism and the second adjustment mechanism being respectively configured to independently adjust emission characteristics of the first light source assembly and the second light source assembly.

5. The dual-light-source red dot sight according to claim 4, wherein the first adjustment mechanism and the second adjustment mechanism are physical keys, touch switches or adjustment rotating screws.

6. The dual-light-source red dot sight according to claim 1, wherein the first light source assembly further comprises a first windage adjustment port and a first elevation adjustment port, which are respectively configured to adjust a windage angle and an elevation angle of the first light beam; and the second light source assembly further comprises a second windage adjustment port and a second elevation adjustment port, which are respectively configured to adjust a windage angle and an elevation angle of the second light beam.

7. The dual-light-source red dot sight according to claim 1, further comprising a first power supply module and a second power supply module disposed within the housing, wherein the first power supply module is configured to supply power to the first light source assembly, and the second power supply module is configured to supply power to the second light source assembly.

8. The dual-light-source red dot sight according to claim 1, wherein the first light source assembly and the second light source assembly are arranged to be staggered from each other in a direction perpendicular to the centerline of the through channel.

9. The dual-light-source red dot sight according to claim 1, wherein the first light source assembly and the second light source assembly are arranged to be aligned with each other in a direction perpendicular to the centerline of the through channel.

* * * * *